(12) United States Patent
Dirnberger et al.

(10) Patent No.: US 9,381,456 B2
(45) Date of Patent: Jul. 5, 2016

(54) AIR FILTER

(71) Applicant: MANN+HUMMEL GMBH, Ludwigsburg (DE)

(72) Inventors: Timo Dirnberger, Marbach (DE); Juergen Stahl, Kornwestheim (DE); Ralf Dietz, Remseck (DE)

(73) Assignee: MANN+HUMMEL GMBH, Ludwigsburg (DE)

( * ) Notice: Subject to any disclaimer, the term of this patent is extended or adjusted under 35 U.S.C. 154(b) by 129 days.

(21) Appl. No.: 14/253,244

(22) Filed: Apr. 15, 2014

(65) Prior Publication Data

US 2014/0305308 A1    Oct. 16, 2014

(30) Foreign Application Priority Data

Apr. 16, 2013   (DE) .................... 10 2013 006 505

(51) Int. Cl.
*B01D 46/00* (2006.01)
*B01D 53/04* (2006.01)

(52) U.S. Cl.
CPC ............ *B01D 46/0036* (2013.01); *B01D 53/04* (2013.01); *B01D 2257/702* (2013.01); *B01D 2259/4516* (2013.01); *B01D 2259/4566* (2013.01)

(58) Field of Classification Search
CPC ............... B01D 46/0036; B01D 53/04; B01D 2257/702; B01D 2259/4516; B01D 2259/4566
USPC .................. 55/385.3; 96/134, 136; 123/198 E
See application file for complete search history.

(56) References Cited

U.S. PATENT DOCUMENTS

| | | | | |
|---|---|---|---|---|
| 3,646,731 A | * | 3/1972 | Hansen | F02M 35/04 123/520 |
| 6,440,200 B1 | * | 8/2002 | Sakakibara | B01D 46/0023 123/519 |
| 8,529,675 B2 | | 9/2013 | Durst et al. | |
| 2006/0130659 A1 | * | 6/2006 | Durst | B01D 46/0036 96/134 |
| 2007/0022880 A1 | * | 2/2007 | Mizutani | B01D 46/0036 96/136 |
| 2008/0028938 A1 | | 2/2008 | Li | |
| 2008/0257160 A1 | * | 10/2008 | Yoshida | B01D 46/0036 96/139 |

* cited by examiner

*Primary Examiner* — Frank Lawrence
(74) *Attorney, Agent, or Firm* — James Hasselbeck

(57) ABSTRACT

A filter device has a filter element arranged in a filter housing. The filter device has additionally an adsorber element that adsorbs hydrocarbons. The adsorber element is arranged in a separate adsorber housing connected to the filter housing.

12 Claims, 4 Drawing Sheets

AIR FILTER

CROSS-REFERENCE TO RELATED APPLICATION

This application claims the benefit of German patent application No. 10 2013 006 505.4 filed Apr. 16, 2013, the entire contents of the aforesaid German patent application being incorporated herein by reference.

BACKGROUND OF THE INVENTION

The invention concerns an air filter with a filter element in a filter housing, comprising an adsorber element for adsorption of hydrocarbons.

U.S. Pat. No. 7,641,720 B2 discloses an air filter for the intake manifold of an internal combustion engine wherein the air filter comprises a filter element in a filter housing and the filter element is flowed through by the supplied combustion air. Downstream of the filter element an adsorber element is integrated in the flow passage of the air filter with which hydrocarbons, which flow back in the direction of the intake manifold after shut-down of the internal combustion engine, can be adsorbed. After restarting, the hydrocarbons that are adsorbed in the adsorber element are then released again into the air flow and transported in the direction of the cylinders of the internal combustion engine.

The adsorber element is embodied as guide vanes which project into the flow passage and are provided with an adsorption layer. In this context, care must be taken that, on the one hand, the flow resistance caused by the guide vanes is not increased in an impermissible way and, on the other hand, a sufficient adsorption capacity is ensured.

SUMMARY OF THE INVENTION

It is the object of the invention to design with simple measures an air filter such that hydrocarbons in the air flow are effectively adsorbed without significant impairment of the flow.

This object is solved according to the invention in that the adsorber element is arranged in an adsorber housing which is embodied separate from the filter housing and is connected to the filter housing in such a way that the flow path in the adsorber housing communicates with the flow passage in the filter housing. The dependent claims provide expedient further embodiments.

The invention relates to an air filter with a filter element in a filter housing, for example, an air filter in an intake manifold of an internal combustion engine for filtration of combustion air to be supplied to the cylinders of the internal combustion engine. The air filter is additionally provided with an adsorber element with which hydrocarbons in the air flow can be adsorbed. After shut-down of the internal combustion engine, such hydrocarbons can flow back in the intake manifold in the direction toward the air filter and are adsorbed thereat by the adsorber element. After restarting, the hydrocarbons are then again released by the adsorber element and conducted in the air flow in the direction toward the cylinders of the internal combustion engine.

The adsorber element is arranged in an adsorber housing that is embodied separate from the filter housing. The adsorber housing with the adsorber element received therein can be connected to the filter housing in such a way that the flow path in the adsorber housing is in fluid communication with a flow passage in the filter housing.

This embodiment has the advantage that the flow conditions in the flow passage, i.e., in the interior of the filter housing, are not affected, or only minimally affected, by the adsorber element. This is in particular advantageous with respect to a mass air flow sensor downstream of the filter element in the flow passage because, for a precise determination of the mass air flow, the flow upstream of the mass air flow sensor must not be impaired in a significant way. The main air flow is oriented toward the flow passage in the filter housing; the main flow is maintained with the arrangement of the adsorber housing and the adsorber element contained therein. A portion of the air flow is guided via the flow path in the adsorber housing and thus through or along the adsorber element where the desired adsorption of hydrocarbons or the release of the stored hydrocarbons in the direction of the exit of the flow passage takes place.

Furthermore, it is advantageous that the adsorber housing as additional component can be flange-connected to the filter housing and joined therewith. This opens up the possibility of optionally connecting the adsorber housing including the adsorber element received therein with the filter housing. Adaptations are only necessary in that a flow connection between the flow passage in the filter housing and the flow path in the adsorber housing must be provided. The flow connection is, for example, generated in that already during the manufacturing process of the filter housing flow openings are introduced into the wall of the filter housing so that a partial air flow is guided into the adsorber housing in the manner of a bypass. When producing the filter housing as an injection-molded plastic part, the tool for producing the housing is furnished with inserts in order to introduce the desired flow openings into the wall of the filter housing. Further adaptations are not required, however. In case that no adsorber element is to be introduced, the wall of the filter housing is designed to be continuous, i.e., without flow openings. The flow openings optionally can also be introduced by retrofitting, or flow openings that are already introduced can be closed off by means of closure elements. Depending on the configuration variant, the air filter can thus be furnished alternatively with or without adsorber housing including the adsorber element contained therein.

The adsorber housing is preferably arranged downstream of the filter element and connected to the filter housing. Hydrocarbons that flow back from the internal combustion engine are thus adsorbed before reaching the filter element.

By means of the flow openings in the wall of the filter housing, the flow passage communicates with the flow path in the adsorber housing which represents a bypass relative to the flow passage. The flow openings are located upstream and downstream of the adsorber element so that a partial air flow is guided via the flow openings through the flow path in the adsorber housing.

An embodiment is possible in which the adsorber housing is designed as a housing shell that is open at one side and is connected to the filter housing in such a way that the adsorber element is shielded relative to the exterior by the housing shell. Inwardly, the outer wall of the filter housing provides a bypass wall. Moreover, a configuration is also conceivable in which the flow openings in the wall of the filter housing are so large or continuously designed that the adsorber element is not positioned in a parallel bypass but instead is immediately connected with the main flow in the flow passage of the filter housing. As a result of its rim-side position in the flow passage, the air flow in this embodiment remains also substantially unaffected by the adsorber element so that no impairment of the mass air flow measurement carried out downstream is present.

According to a further expedient embodiment, it is provided that the cross-sectional surface area of the flow path in the adsorber housing is smaller than the cross-sectional surface area of the flow passage in the filter housing at the level of the flange-connected adsorber housing. The cross-sectional surface area of the flow path in the adsorber housing is, for example, not more than 25% of the cross-sectional surface area of the flow passage in the filter housing. This ensures that the main flow downstream of the filter element is substantially unaffected by the adsorber element. The most advantageous cross-sectional surface area is determined by means of CFD calculation (computational fluid dynamics) in accordance with the respective conditions and may deviate from a value of 25% of the cross-sectional surface area of the flow passage.

According to a further advantageous embodiment, the filter housing has a recess into which the adsorber housing is inserted. The recess in the filter housing reduces the space requirement for the adsorber housing so that, as a whole, no larger, or only an insignificantly larger, mounting space for the air filter, including adsorber housing and adsorber element, is required. The recess in the filter housing can be designed, for example, such that with the inserted adsorber housing a flat-surfaced or approximate flat-surfaced outer contour of filter housing and adsorber housing is provided.

According to a further advantageous embodiment, the adsorber housing is arranged adjacent to a bend of the flow passage in the filter housing. The bend of the flow passage can be provided with flow guiding ribs having flow openings arranged at their end faces through which the flow passage in the filter housing communicates with the flow path in the adsorber housing. The flow openings can optionally extend across a larger portion of the length of the flow path in the adsorber housing.

BRIEF DESCRIPTION OF THE DRAWINGS

Further advantages and expedient embodiments are disclosed in the further claims, the Figure description, and the drawings.

In the Figures, same components are provided with same reference characters.

DESCRIPTION OF PREFERRED EMBODIMENTS

Figure 1:
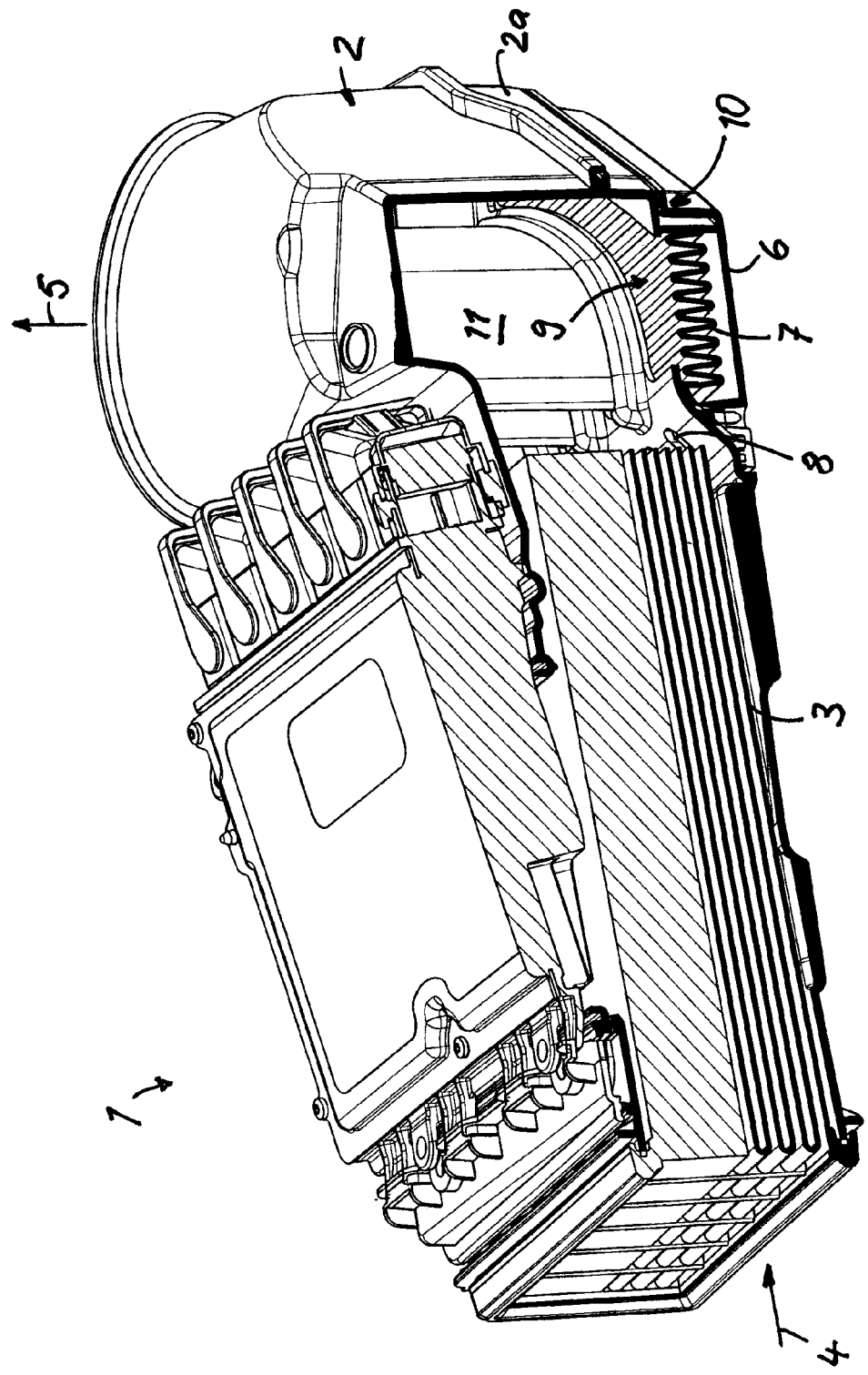
FIG. 1 shows in perspective view an air filter with an adsorber housing which is flange-connected downstream of the filter element to the filter housing and in which an adsorber element is received.
Figure 2:
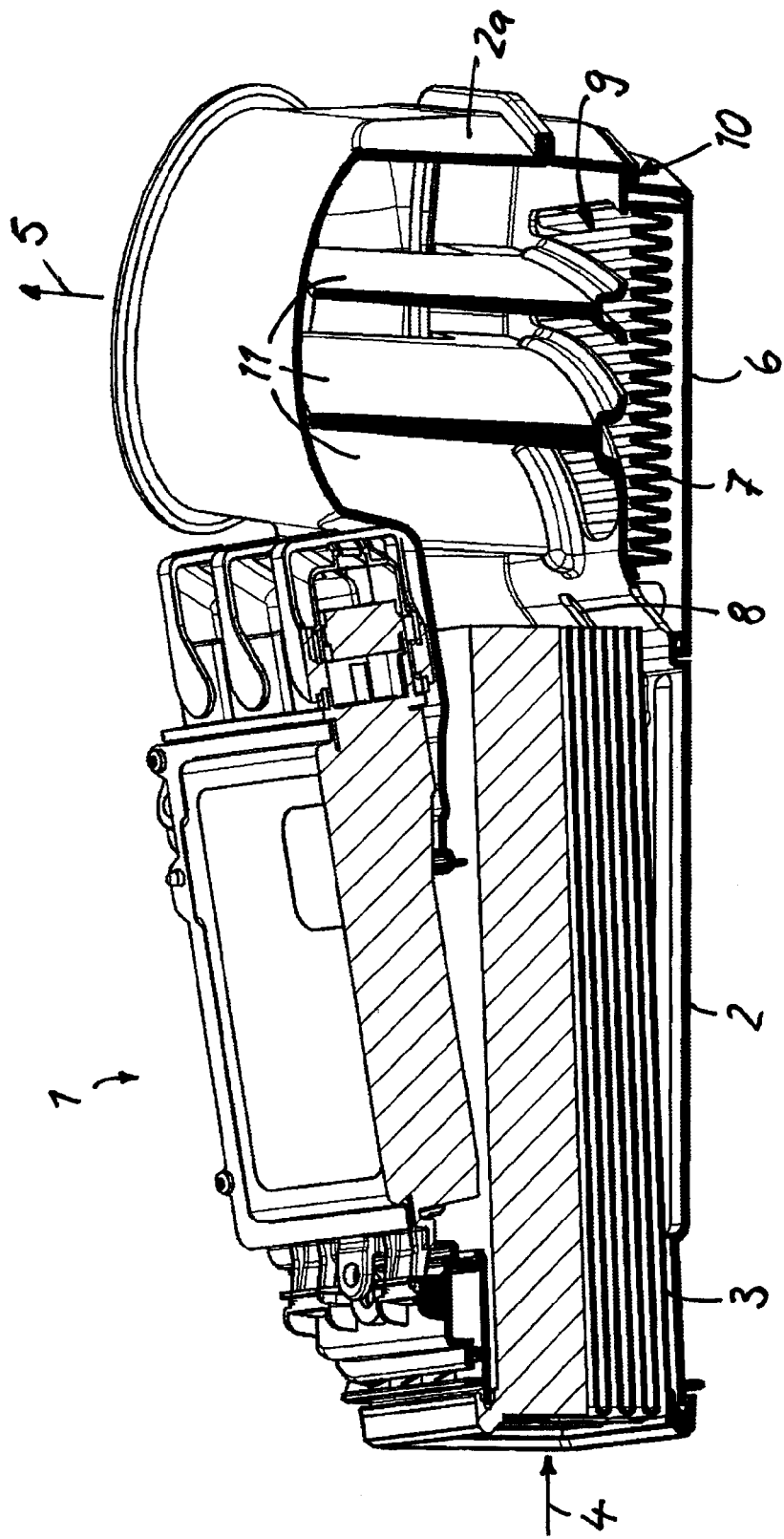
FIG. 2 shows the air filter in a further perspective view.
Figure 3:
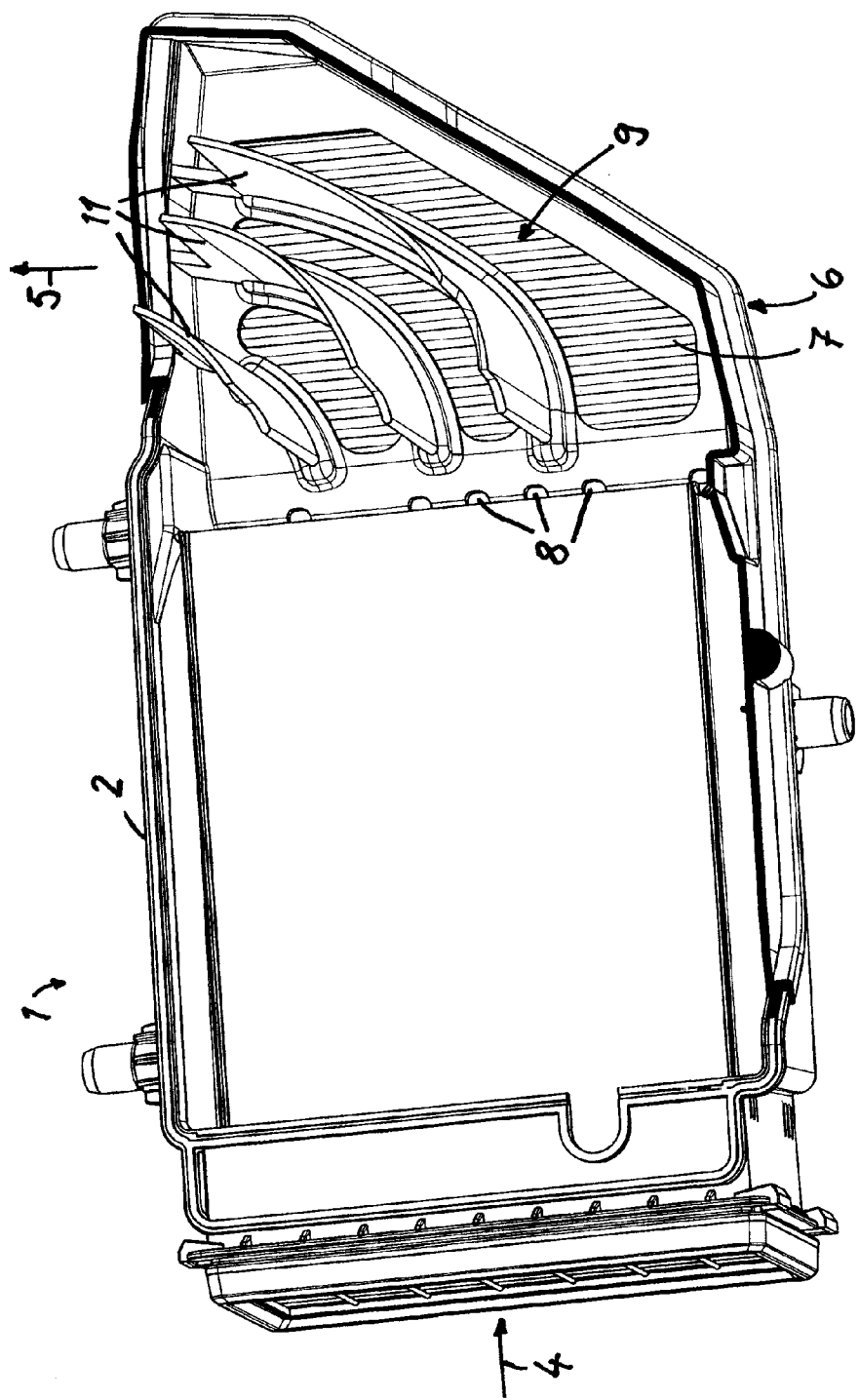
FIG. 3 shows the air filter in a view from above without upper housing shell.

In FIGS. 1 through 3, an air filter 1 is illustrated which is used in the intake manifold of an internal combustion engine in order to subject the combustion air to be supplied to the cylinders of the internal combustion engine to a filtration. The air filter 1 has in a filter housing 2 a filter element 2 which is flowed through by the supplied combustion air. Inflow into or outflow from the filter housing is identified with reference characters 4 and 5. The filter housing 2 has a straight section, facing the inflow side and containing the parallelepipedal filter element 3, as well as a bend 2a which adjoins it and by means of which outflow out of the air filter 1 is realized. The bend 2a of the filter housing 2 adjoins downstream the area with the filter element 3.

An adsorber housing 6 with an adsorber element 7 received therein is flange-connected to the filter housing 2. The adsorber element 7 serves for adsorption of hydrocarbons in the air flow which is passed through the air filter 1. Such hydrocarbons can flow back after shut-down of the internal combustion engine via the intake manifold in the direction toward the air filter and are adsorbed thereat by the adsorber element 7. After restarting the internal combustion engine, the air flow is then again oriented in the direction of arrows 4 or 5, i.e., toward the cylinders of the internal combustion engine, so that the hydrocarbons are transported again out of the adsorber element to the internal combustion engine.

The adsorber housing 6 is a component which is embodied separate from the filter housing 2 and which, downstream of the filter element 3, is connected to the filter housing 2 in the area of the bottom side of the bend 2a. The adsorber housing 6 can be connected mechanically, by gluing, or by welding with the filter housing 2.

In the wall of the filter housing 2, flow openings 8 and 9 are provided by means of which the flow passage in the filter housing 2 communicates with the flow path through the adsorber housing 6 with the adsorber element 7 received therein. The first flow openings 8 are located immediately downstream of the filter element 3 in the wall 2 and serve for introducing a partial air flow from the flow passage in the filter housing 2 into the adsorber housing 6. The flow path in the adsorber housing 6 represents a bypass for the main flow in the flow passage through the filter housing 2.

The further flow openings 9 represent outflow openings by means of which, downstream of the adsorber element 7, the partial air flow through that is guided through the adsorber housing 6 is joined again with the main flow in the flow passage through the filter housing 2.

The adsorber housing 6 is inserted into a recess 10 which is located downstream of the filter element 3 at the bottom side of the filter housing 2. The recess is dimensioned such that the bottom side of the filter housing, with inserted adsorber housing 6, forms with the adsorber housing 6 a flat outer contour. In this way, it is ensured that also with inserted adsorber housing 6 no additional mounting space is occupied.

Compared with the cross-sectional surface area of the flow passage in the filter housing 2, the cross-sectional surface area of the flow path in the adsorber housing 6 is significantly smaller. The ratio of cross-sectional surface areas of flow passage in the filter housing 2 to the flow path in the adsorber housing 6 is at least 4:1, optionally the ratio is even significantly higher such as, for example, 6:1, 8:1 or 10:1. As a result of the differently sized cross-section ratios and as a result of the rim-side arrangement of the adsorber housing 6 on the filter housing 2, the main air flow through the flow passage in the filter housing 2 is not significantly impaired by the adsorber housing 6 with the adsorber element 7. Accordingly, a mass air flow sensor which is arranged at the outlet side of the air filter 1 can operate properly and is not impaired by the adsorber housing 6 or the adsorber element 7.

The adsorber housing 6 with the adsorber element 7 can be connected optionally to the bottom side of the filter housing 2. In case of a connection, the flow openings 8 and 9 are introduced in the wall of the filter housing 2 in order to enable flow connection to the flow path in the adsorber housing through the adsorber element 7. In case the air filter 1 is to be furnished without adsorber element, the flow openings 8 or 9 remain closed so that the air flow is realized exclusively through the flow passage in the filter housing 2.

The flow openings 8 and 9 can be produced by appropriate inserts in the tool for producing the filter housing 2 as an injection-molded plastic part. Optionally, the flow passages 8 and 9 can also be retrofitted into the filter housing 2.

The adsorber housing 6 is located at the bottom side of the bend 2a with which the filter housing 2 defines a 90° angle. For improved flow guiding action, flow guiding elements in the form of flow guiding ribs 11 are projecting into the flow passage in the filter housing 2 and are monolithically formed with the filter housing 2 or are fixedly connected to the filter housing 2. The flow guiding ribs 11 are designed in a segment shape and extend across an angle segment of approximately 90°. In the flow passage in the interior of the filter housing 2, several flow guiding ribs 11 are arranged that are concentric relative to each other. At their end face, the flow openings 9 are provided by means of which the outflow of the partial air flow from the flow path in the adsorber housing 6 into the main flow in the flow passage in the filter housing 2 is realized. The flow guiding ribs alternatively can be arranged differently than concentric relative to each other. The flow openings 9 are located between neighboring flow guiding ribs 11, respectively, or between a laterally arranged flow guiding rib 11 and the housing wall of the filter housing 2. The flow openings 9 are located adjacent to the lower end faces of the flow guiding ribs 11 which are facing the adsorber housing 6.

The first flow openings 8 which are introduced immediately adjacent to the filter element 3 in the wall of the filter housing 2 have the shape of elongate flow recesses, as can be seen in FIGS. 1 and 2. The second flow openings 9 which are located adjacent to the flow guiding ribs 11 follow the contour of the flow guiding ribs and extend across a large portion of the length of the adsorber element 7.

The adsorber housing 6 is embodied as a housing shell or half shell which is open at one side so that the adsorber element 7 received therein is enclosed only outwardly by the adsorber housing 6. Relative to the flow passage in the filter housing 2, a boundary is created by the wall of the filter housing with the flow openings 8 and 9 arranged therein.

Figure 4:
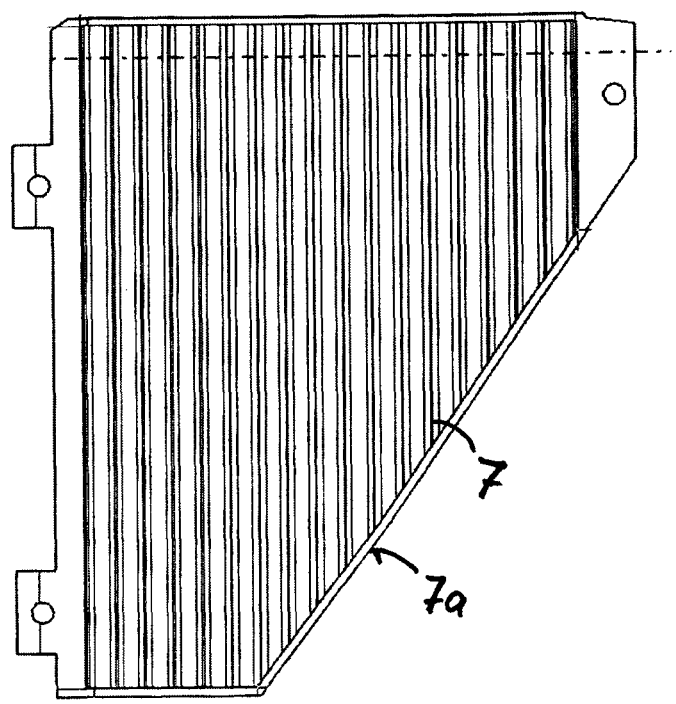
FIG. 4 is a plan view onto the adsorber element.

In FIG. 4, the adsorber element 7 is shown in plan view. The adsorber element 7 has the contour of an asymmetrically embodied trapezoid with a slantedly extending edge 7a which follows the curvature in the bend 2a of the filter housing 2. The adsorber geometry can alternatively also be rectangular, in particular square, or can be symmetrically embodied in an another shape.

While specific embodiments of the invention have been shown and described in detail to illustrate the inventive principles, it will be understood that the invention may be embodied otherwise without departing from such principles.

What is claimed is:

1. A filter device comprising:
a filter housing;
a filter element disposed in the filter housing;
an adsorber housing;
an adsorber element adapted to adsorb hydrocarbons and disposed in the adsorber housing;
wherein the adsorber housing is embodied separate from the filter housing and is connected to the filter housing such that a flow path in the adsorber housing communicates with a flow passage in the filter housing;
wherein the filter housing has a wall provided with flow openings; and
wherein, through the flow openings, the flow passage in the filter housing is connected with the flow path in the adsorber housing upstream and downstream of the adsorber element.

2. The filter device according to claim 1, wherein the adsorber housing is connected to the filter housing downstream of the filter element.

3. The filter device according to claim 1, wherein the adsorber housing is a housing shell which is open at one side.

4. The filter device according to claim 1, wherein a cross-sectional surface area of the flow path in the adsorber housing is smaller than a cross-sectional surface area of the flow passage in the filter housing in the area of the adsorber housing.

5. The filter device according to claim 4, wherein the cross-sectional surface area of the flow path in the adsorber housing is maximally 25% of the cross-sectional surface area of the flow passage in the filter housing.

6. A filter device comprising:
a filter housing;
a filter element disposed in the filter housing;
an adsorber housing;
an adsorber element adapted to adsorb hydrocarbons and disposed in the adsorber housing;
wherein the adsorber housing is embodied separate from the filter housing and is connected to the filter housing such that a flow path in the adsorber housing communicates with a flow passage in the filter housing;
wherein the filter housing has a recess and the adsorber housing is inserted into the recess.

7. The filter device according to claim 6, wherein the recess in the filter housing is configured such that, when the adsorber housing is inserted in the recess, the filter housing together with the adsorber housing has an at least approximately flat outer contour.

8. A filter device comprising:
a filter housing;
a filter element disposed in the filter housing;
an adsorber housing;
an adsorber element adapted to adsorb hydrocarbons and disposed in the adsorber housing;
wherein the adsorber housing is embodied separate from the filter housing and is connected to the filter housing such that a flow path in the adsorber housing communicates with a flow passage in the filter housing;
wherein the adsorber housing is arranged adjacent to a bend of the flow passage in the filter housing;
wherein the filter housing has flow guiding ribs that are disposed in the bend of the flow passage,
wherein the flow guiding ribs have end faces, and
wherein flow openings that connect the flow passage in the filter housing with the flow path in the adsorber housing are arranged adjacent to the end faces.

9. The filter device according to claim 6, wherein a cross-sectional surface area of the flow path in the adsorber housing is smaller than a cross-sectional surface area of the flow passage in the filter housing in the area of the adsorber housing.

10. The filter device according to claim 9, wherein the cross-sectional surface area of the flow path in the adsorber housing is maximally 25% of the cross-sectional surface area of the flow passage in the filter housing.

11. The filter device according to claim 8, wherein a cross-sectional surface area of the flow path in the adsorber housing is smaller than a cross-sectional surface area of the flow passage in the filter housing in the area of the adsorber housing.

12. The filter device according to claim 11, wherein the cross-sectional surface area of the flow path in the adsorber housing is maximally 25% of the cross-sectional surface area of the flow passage in the filter housing.

* * * * *